UNITED STATES PATENT OFFICE.

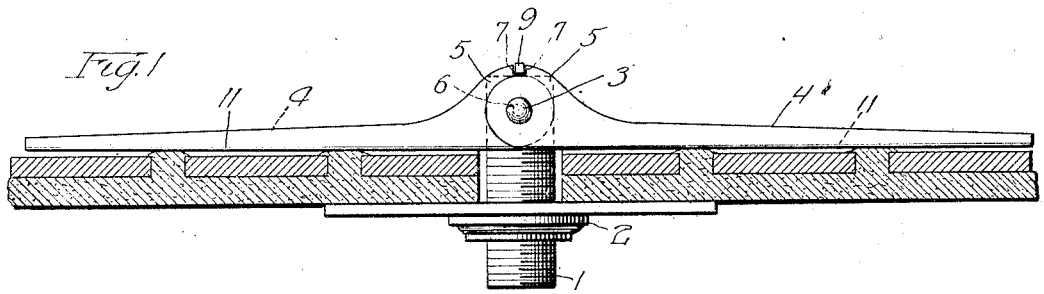
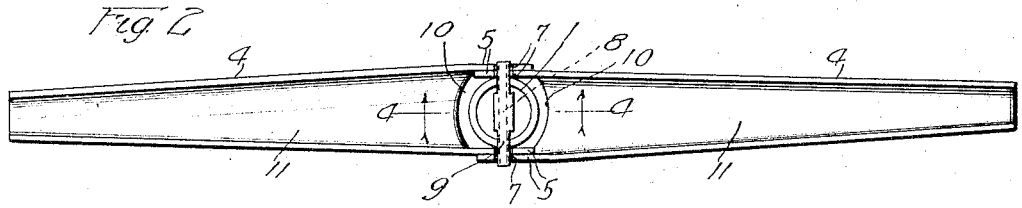
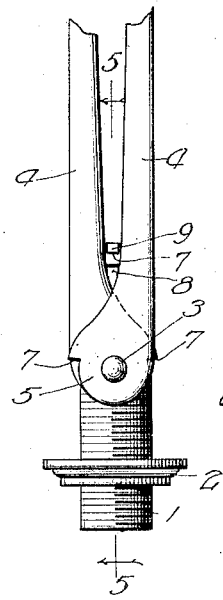
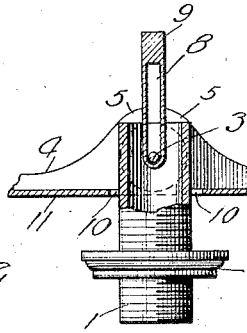
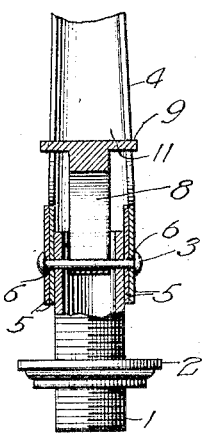

MATHEW H. PAINE, OF GLENELLYN, AND WINFIELD S. WILLIAMS, OF CHICAGO, ILLINOIS, ASSIGNORS TO PAINE COMPANY, A CORPORATION OF ILLINOIS.

BOX-HANGER.

1,326,959.                 Specification of Letters Patent.        Patented Jan. 6, 1920.

Application filed April 3, 1918. Serial No. 226,395.

*To all whom it may concern:*

Be it known that we, MATHEW H. PAINE, of Glenellyn, Illinois, and WINFIELD S. WILLIAMS, of Chicago, Illinois, citizens of the United States of America, have invented a certain new and useful Improvement in Box-Hangers, of which the following is a specification.

Our invention relates to an improvement in that class of devices which are used for supporting outlet boxes, lighting fixtures, fans, piping, and other equipment. Our main object is to provide a device which has maximum supporting strength, which is cheap in construction, of few parts, will involve no skill to install, is automatic in its application, and requires a minimum cutting of the wall structure. It is of common knowledge to the trade that in attaching over-head fixtures it is required that the same be supported from above the ceiling; and that the said support shall have a large spread to secure mass holding strength.

Our invention will be more readily understood by reference to the accompanying drawings in which:

Figure 1 is an elevation of the device showing its relation when fully set for service.

Fig. 2 is a top view of the device.

Fig. 3 is an elevation showing the device ready to be passed through a hole.

Fig. 4 is a sectional view taken on lines 4—4 of Fig. 2.

Fig. 5 is a sectional view taken on lines 5—5 of Fig. 3.

In the accompanying drawings the device comprises a hollow supporting member 1, having a portion of the same threaded for attaching to a fixture. Threaded on the same is a nut 2, adapted for use when an outlet box is to be attached to a ceiling. Transverse of the supporting member is a pin 3, adapted to serve as an axis for the activity of a pair of wing elements 4—4, which said wing elements we sometimes denominate truss members, and anchoring members. These anchoring members are preferably U shaped in cross-section and may taper from the pivotal point outward but that is not fundamental to the structure. The said anchoring members 4, 4, may be preferably duplicates, and are arranged to function swingingly upon the pin 3, in reverse relation. They are adapted to fold one into the other, as shown in Fig. 3, preparatory to passing through a hole. Each of said anchoring members has an ear extension 5 of the side wall, which said ear 5 has a hole 6 transversely perforating same; the said holes in each being alined, and adapted to register with the holes in the other of said anchoring members when the pair of anchoring members are assembled on the pin 3 for functioning. On the upper edge of the ear 5, in substantially vertical alinement with the hole 6, we provide a shoulder 7, which is adapted to serve as an abutment, or locking point, for the anchoring member 4 so as to bring the wall engaging surfaces 11 into substantially horizontal alinement when the said anchoring members are in final anchoring position. This shoulder 7 may be placed at any position on the sector of ear 5 which may be found advisable for the angular relation of the said anchoring members when they are in the final anchoring position desired. We provide a device consisting of a bar 9 adapted to automatically fall synchronously with the anchoring members 4 and seat itself in the channel formed by the shoulders 7, after the anchoring members 4 have reached a substantially horizontal alinement; and we provide in connection with said bar 9 a loop 8, said loop 8 adapted to loop around the pin 3 inside of the supporting member 1, the cross-bar 9 having ends extending sufficiently to reach beyond the side walls of the said anchoring members 4 when assembled on the pin 3. We provide that loop 8 shall be sufficiently long to allow free play of the locking device when the device is turned up-side down, or folded for insertion in the ceiling—as in Figs. 3—4—5. We provide that the side walls of the anchoring members may taper from any point outside the arc described by the shoulders 7, and in so doing it will be observed that the locking member 9 will stand clear of the ears 5 and preserve a parallel position with relation to the wall-engaging surfaces of the anchoring members 4, when they are ready for insertion through a hole.

It will be obvious that when the device is turned up-side down the tendency of the locking device is to fall clear of the shoulder 7 on the ears 5; but is held loosely by the loop 8 in conjunction with the pin 3; in so doing the anchoring members are free to take a vertical position and fold one into the other with a total circumferential diameter slightly greater than the outside diameter of the supporting member. When the device is raised to a position for insertion in a hole, and pushed through a hole, it will be obvious that immediately the anchoring members have passed through the hole the force of gravity will force the same to swing outwardly on their axis. We provide a cut-away section 10 in the connecting web 11 of the anchoring members 4 adapted to coact with the supporting member 1 and check the annular movement outward and downward of the anchoring members. When the said anchoring members are falling to a horizontal position, the locking device is falling vertically, until it rests as a key in the grooves formed by the shoulders 7 on the ears 5 of the opposed truss elements. It will be observed that this arrangement permits a certain freedom of movement of the supporting member after the anchoring members are in locked horizontal position thus affording adjusting means in the event that the surfaces against which the device rests shall be uneven; bringing the supporting member to always stand at right angles to the face of the ceiling. We preferably provide that the web 11 of the anchoring member 4 shall be the wall engaging side of the anchoring member so that a flat holding surface shall be presented to the wall surfaces.

We show this preferred form of our invention to illustrate the principle but we do not limit ourselves to this specific form, except as required by the scope of the claims.

What we claim and desire to secure by Letters Patent is:—

1. In a device of the character described the combination of a supporting member; a plurality of anchoring members swingingly associated with the supporting member adapted to fold longitudinally of the supporting member and gravitate to an anchoring position; means to lock the anchoring members at a predetermined angle.

2. In a device of the class described, the combination of a supporting member; an axis on the said supporting member; anchoring members swingingly associated with said supporting member adapted to fold longitudinally of the supporting member and gravitate to an anchoring position; automatic means adapted to lock said anchoring members in a final anchoring position.

3. In a device of the character described the combination of a supporting member having an axis; a pair of truss members swingingly associated with the said supporting member adapted to fold longitudinally of the supporting member and adapted to swing outwardly by gravity into a trussed anchoring position; automatic means to lock the truss members in said anchoring position.

4. In a hanger of the class described the combination of a supporting member having an axial bearing transverse thereof; a pair of truss members coaxially pivoted thereon, adapted to fold in longitudinal extension of the supporting member and gravitate normally to a horizontal transverse position.

5. In a device of the class described, the combination of a stud having an axis transverse thereof, a pair of anchoring members swingingly associated thereon adapted to fold longitudinally of the supporting member and gravitate to an anchoring position, means to limit their annular travel, and automatic means to lock the said anchoring members in a fixed truss position.

6. In a device for the purposes described, the combination of a mounting; a plurality of anchoring members pivotally mounted thereon adapted to fold longitudinally of the mounting and gravitate to an anchoring position; automatic locking means to determine the final anchoring position of the pivoted members; and means to check the annular travel of the members in the opposite direction.

7. A supporting member; a pair of truss members rotatably mounted on the said supporting member adapted to fold in parallel extension of the supporting member and adapted to swing outward by gravity to any given angle, automatic means to lock the anchoring members at any given anchoring position.

8. In a hanger of the class described the combination of a supporting member having an axial bearing transverse thereof; a pair of truss members coaxially pivoted thereon adapted to fold in longitudinal extension of the supporting member and fall by gravity to an anchoring position; there being means to lock the said truss members in an anchoring position substantially transverse of the supporting member.

9. In a device for the purposes described, the combination of a hollow supporting member; a pin transverse the said supporting member; a pair of swinging truss members functioning on the said pin and overlapping the supporting member; and a locking mechanism coöperating with the said truss members and the pin adapted to automatically lock the truss members in an anchoring position.

10. In a device of the class described, the combination of a supporting member; an axis on said supporting member; anchoring members pivotally mounted on the axis, the anchoring members adapted to normally swing out from the supporting member and arranged to coact with the stud to limit their outwardly swinging movement; means to lock the anchoring members in an angular truss position.

11. In a device for the purposes described the combination of a supporting member having an axis transverse thereof; two oppositely disposed anchoring members coaxially pivoted on said axis and having surfaces adapted for engagement with a wall; said anchoring members adapted to fall of their own weight to a predetermined angular position until said wall engaging surfaces stand at substantially right angles to the longitudinal axis of said supporting member; means to lock the said anchoring members in a trussed anchoring position.

12. In an anchoring device the combination of a supporting member having pivotal bearings; two folding anchoring members pivoted coaxially thereon, said anchoring members adapted to fold longitudinally of said supporting member, in longitudinal extension thereof; said anchoring members adapted normally to swing upon the said axis, there being means to limit their lateral projection, and means to lock the said anchoring members in a final anchoring position.

13. A device for the purposes described consisting of a supporting member; a pair of truss members swingingly associated with said supporting member and movable by gravity laterally from the supporting member outwardly with respect to the same into anchoring position; means to limit said lateral projection, and automatic means to lock the said members at a predetermined angle.

14. In an anchoring device the combination of a supporting member having an axis; two truss members reversely disposed having pivotal points coincident coaxially disposed on said axis; the said truss members coacting with the supporting member to determine the outward lateral travel of the said truss members; and automatic means coacting with the pivotal bearing to lock the said anchoring members in a horizontal truss position.

15. In a device for the purposes described the combination of a supporting member having an axis; a pair of oppositely disposed anchoring members adapted to swing upon said axis, the said anchoring members adapted to swing laterally with respect to each other around their axis to an anchoring position; means to determine their axial travel, and means to lock the anchoring members against reverse travel after they have attained final anchoring position.

16. In an anchoring device the combination of a supporting member having a pivotal bearing; two truss members coaxially pivoted upon the bearing; the truss members adapted to swing on the axis by their own weight; said supporting member adapted to act as the center of the truss members and the truss members adapted to coöperate with the stud to form an anchoring truss; automatic means to lock the truss members in an anchoring position.

17. In a device of the character described a pair of anchoring elements swingingly mounted with relation to each other, carried by a supporting element; the said anchoring elements adapted to automatically fall by their own weight to a predetermined angular position; means to limit their annular movement; and automatic means to lock the anchoring elements when they have reached a predetermined anchoring position.

Signed at Chicago, Cook county, State of Illinois, this 28th day of March, 1918.

MATHEW H. PAINE.
WINFIELD S. WILLIAMS.